United States Patent
Katoh et al.

(10) Patent No.: US 8,523,722 B2
(45) Date of Patent: Sep. 3, 2013

(54) PULLEY FOR CONTINUOUSLY VARIABLE TRANSMISSION

(75) Inventors: Jun Katoh, Kobe (JP); Hideo Hata, Kobe (JP); Kenji Yamamoto, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 543 days.

(21) Appl. No.: 12/376,202

(22) PCT Filed: Aug. 17, 2007

(86) PCT No.: PCT/JP2007/066042
§ 371 (c)(1),
(2), (4) Date: Feb. 3, 2009

(87) PCT Pub. No.: WO2008/026459
PCT Pub. Date: Mar. 6, 2008

(65) Prior Publication Data
US 2010/0009795 A1  Jan. 14, 2010

(30) Foreign Application Priority Data
Aug. 30, 2006 (JP) .................. 2006-234055

(51) Int. Cl.
*F16H 55/36* (2006.01)

(52) U.S. Cl.
USPC ....................................... 474/166

(58) Field of Classification Search
USPC ................................ 474/166–199
See application file for complete search history.

(56) References Cited

U.S. PATENT DOCUMENTS

| | | | | |
|---|---|---|---|---|
| 3,385,739 A | * | 5/1968 | Danis | 148/226 |
| 4,486,247 A | * | 12/1984 | Ecer et al. | 148/318 |
| 5,302,157 A | * | 4/1994 | Ogura et al. | 474/166 |
| 6,254,503 B1 | | 7/2001 | Chiba et al. | |
| 2003/0219178 A1 | * | 11/2003 | Tanaka et al. | 384/91 |
| 2004/0251312 A1 | * | 12/2004 | Campion et al. | 239/88 |
| 2005/0221938 A1 | | 10/2005 | Yoshida et al. | |

FOREIGN PATENT DOCUMENTS

| | | |
|---|---|---|
| EP | 1 167 561 A2 | 1/2002 |
| EP | 1 167 561 A3 | 1/2002 |
| JP | 62-288763 | 12/1987 |
| JP | 2000 002307 | 1/2000 |
| JP | 2000 130527 | 5/2000 |
| JP | 2005 321090 | 11/2005 |
| JP | 2006 161144 | 6/2006 |

* cited by examiner

Primary Examiner — Thomas B Will
Assistant Examiner — Mai Nguyen
(74) Attorney, Agent, or Firm — Oblon, Spivak, McClelland, Maier & Neustadt, L.L.P.

(57) ABSTRACT

Disclosed is a pulley capable of meeting requirements for both enhancement in friction coefficient, and maintenance of abrasion resistance, required of a belt CVT (continuously variable transmission).

The pulley is a pulley of the continuously variable transmission for effecting power transmission between an element and the pulley, being composed of a steel stock containing a predetermined amount of Mn, wherein the surface of the steel stock has a surface-hardened layer of either a nitriding layer or a carbonitriding layer, containing the predetermined amount of Mn, and the surface-hardened layer has properties for stably securing friction coefficient not lower than 0.115, exceeding the friction coefficient of SCr420H steel currently in use, and maintaining abrasion resistance equivalent to the abrasion resistance of the SCr420H steel, or improving the same.

16 Claims, 1 Drawing Sheet

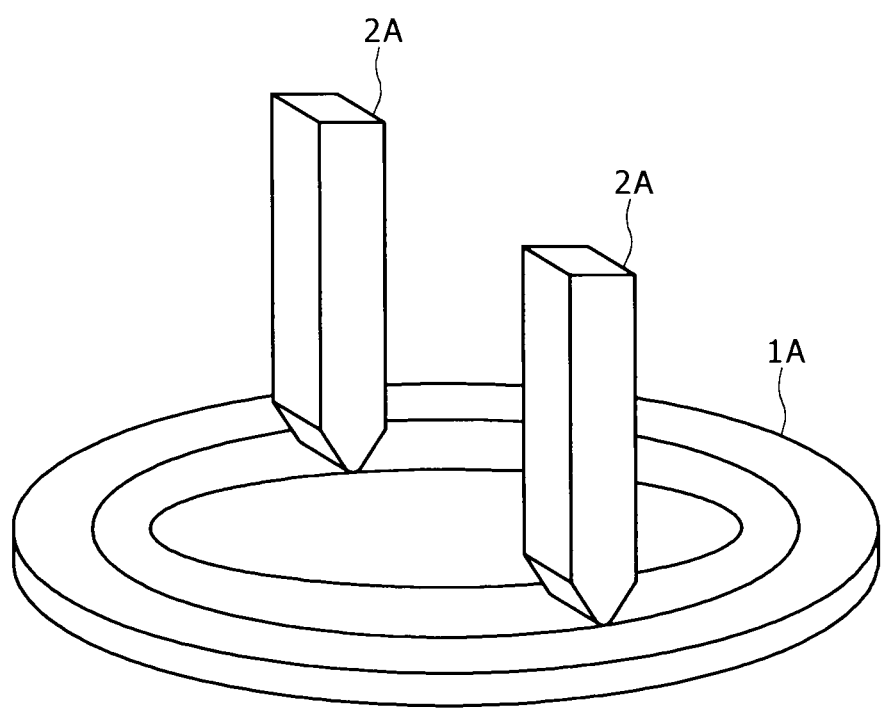

PULLEY FOR CONTINUOUSLY VARIABLE TRANSMISSION

TECHNICAL FIELD

The present invention relates to a pulley member for a continuously variable transmission used in the automobile, and so forth, and in particular, to a pulley member capable of efficiently transmitting driving force to a belt through the intermediary of an element in a belt-type continuously variable transmission (belt CVT).

BACKGROUND ART

The number of belt CVTs mounted in an automobile has since gradually increased for improvement in automotive fuel economy. With a strong social demand for $CO_2$ gas emission control in the background, progress has lately been made in technological development toward further enhancement in efficiency of the belt CVT. With the belt CVT, a multitude of block-like components bundled up with a multi-layer metal belt, called an element, are sandwiched between two pulleys opposing each other, and power transmission is effected by the agency of a frictional force generated upon slidable movement occurring between the element and the pulleys. Accordingly, power transmission efficiency can be enhanced by increasing a friction coefficient between the pulley and the element On the other hand, from the viewpoint of stabilizing slidable movement between the pulley and the element, there is the need for enhancement in abrasion resistances of the pulley and the element, respectively, and if a wear depth is large (poor in abrasion resistance), gradual deterioration in power transmission performance is anticipated even in the case of high friction (high in friction coefficient). Conversely, even if abrasion resistance is excellent, the same can be said in the case of low friction (low in friction coefficient).

In order to cope with such a problem as described, a technology for improving friction/wear properties has since been proposed. For example, as described in Patent document 1, there has been proposed a method comprising the steps of enhancing discharge characteristic of an lubricating oil by controlling surface roughness of a pulley to a given state, thereby reducing a thickness of an oil film formed between the pulley and an element, and raising an inter-metallic contact ratio to thereby increase a friction coefficient.

Further, in Patent documents 2, and 3, respectively, there has been disclosed a method for improving tumbling fatigue strength by providing contact surfaces of an pulley, and so forth with high compressive stress by applying shot-blasting, and improving abrasion resistance of sliding faces to thereby maintain a high friction coefficient.

Still further, for the pulley of this kind, use has since been made of an alloy steel for machine construction, such as SCr420H, and so forth, containing Mn, and Cr, in given amounts, respectively. Further, in Patent documents 4, 5, and 6, respectively, there has been proposed a carburized steel for use in a pulley, chemical composition thereof, including C, Si, Mn, and so forth, being adjusted to thereby improve mechanical properties such as fatigue strength, and so forth.

Patent document 1: JP-A No. 2002-213580
Patent document 2: JP-A No. 5 (1993)-157146
Patent document 3: JP-A No. 2000-130527
Patent document 4: JP-A No. 2000-160288
Patent document 5: JP-A No. 2005-200667
Patent document 6: JP-A No. 2006-28568

DISCLOSURE OF THE INVENTION

In Patent document 1, electron beam machining is used for case-hardening of a steel stock, and patterning thereof, however, a pulley for a belt CVT, manufactured as above, becomes poor in productivity, and high in cost, as an automotive component, so that there is a problem in that the pulley lacks in practicality. Further, with the methods according to Patent documents 2, 3, respectively, abrasion resistance of the surface of the steel stock, finished by shot-blasting, has certainly been enhanced, however, effects of enhancement in friction coefficient, required of the pulley for the belt CVT, have been found still insufficient.

Thus, enhancement in friction coefficient, and maintenance of abrasion resistance are fundamentally requirements contradicting each other, and if a contact ratio between the element and the pulley is increased in order to enhance friction coefficient, there will be an increased tendency of abrasion resistance undergoing deterioration. For this reason, efforts are industrially being made to adjust hardness of the surface of the pulley, or to improve a lubricating oil, however, suitable combination of steps, including improvement in the lubricating oil, is yet to be found as of now.

Consequently, a case-hardened steel, such as SCr420H, and so forth, subjected to carburizing quenching, and tempering, finished by grinding, has subsequently been put to use as the pulley for the belt CVT up to now although the requirements described as above have not been fully met. It has been well known that SK1 to SK7, SCM, SCM440, SCM445, SKD11, and so forth, besides SCr420H, have also been applied to the pulley for the belt CVT. However, work to develop a dedicated member for use as a pulley, meeting the requirements described as above, has hardly been done, so that the requirements, that is, the enhancement in friction coefficient, and the maintenance of abrasion resistance, required of the pulley for the belt CVT, have not been met as yet.

The invention has been developed in order to solve problems described in the foregoing, and it is therefore an object of the invention to provide a pulley for a belt CVT, capable of fully meeting requirements for enhancement in friction coefficient, and maintenance of abrasion resistance, required of the pulley.

In accordance with one aspect of the present invention, there is provided a pulley of a continuously variable transmission, for effecting power transmission between an element and the pulley, the pulley for the continuously variable transmission, comprising a steel stock containing: C from 0.1 to 0.3 mass %; Si from 0.1 to 0.5 mass %; and Mn from 1 to 10 mass %, respectively, the balance comprising Fe and unavoidable impurities, wherein the surface of the steel stock has a surface-hardened layer of either a nitriding layer or a carbonitriding layer, containing 1 to 10 mass % of Mn, and having an average thickness not less than 10 μm.

Further, in order to attain the object described as above, the steel stock preferably further contains 1 to 20 mass % of Cr, and the surface-hardened layer preferably further contains 1 to 20 mass % of Cr. Similarly, nitrogen content of the surface-hardened layer is preferably in a range of 3 to 25 at. %. Further, surface hardness of the surface-hardened layer is preferably in a range of Hv750 to 950 similarly to the above.

The enhancement in friction coefficient, required of the pulley for the belt CVT, as referred to in the present invention, quantitatively means that friction coefficient of the surface-hardened layer is preferably not lower than 0.115.

With the present invention, simulated sliding test conditions were set up by analyzing actual contact state between a pulley and an element, having thereby found material conditions of the pulley, the surface thereof, being capable of reconciling enhancement in friction coefficient with maintenance of abrasion resistance in such environments, whereupon the present invention has been successfully developed.

More specifically, with the present invention, the surface of the pulley (the surface of a steel stock for the pulley) is a surface-hardened layer of either a nitriding layer or a carbonitriding layer, containing a predetermined amount of Mn. By doing so, the friction coefficient of the pulley for the belt CVT can be enhanced as compared with carburized SCr420H steel available at present. Further, a wear depth on the part of the element can be concurrently controlled, thereby enabling abrasion resistance withstanding practical use to be maintained. That is, it is possible to provide a pulley for a belt CVT, capable of fully meeting the requirements for the enhancement in friction coefficient, and maintenance of abrasion resistance, required of the pulley.

A mechanism wherein the predetermined amount of Mn, contained in the nitriding layer or the carbonitriding layer, makes a contribution to the enhancement in the friction coefficient of the surface of the pulley (the surface of the steel stock for the pulley) is not necessarily clarified. However, it has been confirmed that Mn is captured in a boundary lubrication film formed at a slidable part between the pulley and the surface of the element and it is evident that Mn contained in the nitriding layer or the carbonitriding layer makes such a contribution to the enhancement in the friction coefficient of the surface of the pulley (the surface of the steel stock for the pulley). Accordingly, there is a possibility that the enhancement in the friction coefficient is reconciled with the maintenance of abrasion resistance by the agency of Mn contained in the nitriding layer or the carbonitriding layer changing structural properties of the boundary lubrication film having strong influence on friction/wear behavior.

BRIEF DESCRIPTION OF THE DRAWINGS

FIG. 1 is a schematic illustration showing a procedure for a vane-on-disk type sliding wear test)

BEST MODE FOR CARRYING OUT THE INVENTION (Chemical Composition of a Steel Stock)

There are described hereinafter reasons for limiting chemical composition of a steel stock of which a pulley for a continuously variable transmission, according to the invention, is composed. Units based on which amounts of respective constituents are expressed hereinafter, or have been expressed in the foregoing are all mass %.

The steel stock for the pulley for the continuously variable transmission, according to the invention, contains C: from 0.1 to 0.3 mass %, Si: from 0.1 to 0.5 mass %, and Mn: from 1 to 10 mass %, respectively, the balance comprising Fe and unavoidable impurities, in order to meet needs for mechanical properties such as strength required of a pulley, and so forth, and to reconcile enhancement in friction coefficient with maintenance of abrasion resistance.

C: 0.1 to 0.3 Mass %

C in this range can fully meet the needs for the mechanical properties such as strength required of a pulley. If C content is excessively low, solid solution hardening of C will be insufficient, resulting in deterioration in hardenability besides strength. On the other hand, if C content is excessively high, workability in fabrication of the pulley will deteriorate. Accordingly, the C content is set to a range of 0.1 to 0.3 mass %. The C content is preferably in a range of 0.15 to 0.25 mass %.

Si: 0.1 to 0.5 Mass %

Si in this range can fully meet the needs for the mechanical properties such as the strength required of the pulley, having an effect of deoxidization as well. If Si content is excessively low, solid solution hardening of Si will be insufficient, resulting in deterioration in the effect of deoxidization besides the strength. If the Si content is less than 0.05 mass %, the effect of deoxidization will be insufficient. On the other hand, if the Si content is excessively high, the workability in fabrication of the pulley will deteriorate. Accordingly, the Si content is set to a range of 0.1 to 0.5 mass %.

Mn: 1 to 10 Mass %

Mn is an important alloying element capable of improving the friction coefficient of a surface hardened layer of the pulley for the continuously variable transmission to not less than 0.115 in terms of friction coefficient as compared with carburized SCr420H steel available at present, and concurrently capable of controlling a wear depth of a pulley element so as to be equivalent to, or less than that for the SCr420H steel currently in use. As described in the foregoing, the surface-hardened layer of either a nitriding layer or a carbonitriding layer is formed on the surface of the pulley (the surface of the steel stock) by applying a surface hardening process of either nitriding or carbonitriding to the steel stock, and Mn in the steel stock is contained in the surface-hardened layer, thereby exhibiting advantageous effects of those layers.

In order that Mn is able to exhibit the advantageous effects thereof, that is, not less than 1 mass % of Mn is contained in the surface-hardened layer formed in the surface of the steel stock, it is required that Mn content in the steel stock is not less than 1 mass %. If the Mn content in the steel stock is less than 1 mass %, it is not possible to cause the surface-hardened layer formed in the surface of the steel stock to contain not less than 1 mass % of Mn by applying the surface hardening process of either the nitriding or the carbonitriding to the steel stock. More specifically, it is not possible to enhance the friction coefficient of the pulley for the belt CVT to not less than 0.115, and to concurrently maintain abrasion resistance withstanding practical use.

On the other hand, if the Mn content in the steel stock exceeds 10 mass %, Mn content of the surface-hardened layer formed in the surface of the steel stock will become high in excess of 10 mass %, so that an effect of enhancement in friction coefficient is not obtained, and a tendency of increase in the wear depth of the pulley element will become stronger. More specifically, if the Mn content in the steel stock deviates above or below the range of 1 to 10 mass %, according to the invention, the effect of enhancement in friction coefficient is not obtained, and the wear depth of the pulley element will increase. In this case, a problem of an increase in the wear depth of the pulley element (an increase in aggressiveness against a mating member) will be more pronounced if the Mn content is low.

In this connection, if the Mn content is 3 mass % in the case of some working examples described later in the present description, the surface-hardened layer has friction coefficient as high as 0.120 as compared with other working examples of the invention, having Mn content less than, or in excess of 3 mass %. From this point of view, the effect of enhancement in the friction coefficient of the surface-hardened layer is not enhanced in proportion to the Mn content, but the effect indicates the maximum value if the Mn content is in the vicinity of 3 mass %. Accordingly, in order to cause an effect of Mn to be more stably exhibited regardless of difference in application environments of the pulley for the belt CVT, the Mn content in the steel stock is preferably kept in the vicinity of 3 mass % within a Mn content range of 2 to 6 mass %.

If the Mn content is in excess of 6 mass %, the effect of enhancement in the friction coefficient of the surface-hardened layer will not be much different from that when the Mn content is not more than 6 mass %, and there is a possibility that the effect of enhancement in the friction coefficient will be less than that when the Mn content is not more than 6 mass % contrary to expectation although the effect of enhancement in the friction coefficient of the surface-hardened layer will be obtained depending on the application environments of the pulley for the belt CVT. For this reason, taking into consideration an increase in cost, due to an increase in the Mn content, and an increase in production cost, the Mn content is preferably not more than 6 mass %. Accordingly, a preferable range of the Mn content in the steel stock, and a preferable range of the Mn content in the surface-hardened layer are each a range from 2 to 6 mass %.

Cr: 1 to 20 Mass %

It is preferable that the steel stock selectively contains 1 to 20 mass % of Cr in addition to Mn, and as a result, the surface-hardened layer contains 1 to 20 mass % of Cr in addition to Mn. While the effect of further enhancement in the friction coefficient can be obtained by composite addition (inclusion) of Cr, it is possible to improve the abrasion resistance of the pulley element (to check the aggressiveness against the mating member). It is presumed that such an effect of Cr as described is attributable to an inclination of Cr to form carbide and nitride with greater ease than Mn. The effect described is found pronounced if not less than 2 mass % of Cr is preferably contained, in which case, the abrasion resistance equivalent to, or higher than that for the steel stock currently in use.

On the other hand, if Cr content in the surface-hardened layer as well as the steel stock is excessively high, exceeding 20 mass %, this will cause deterioration in the friction coefficient contrary to expectation, and an tendency that the effect of addition or inclusion of Mn is offset will become stronger. Further, a tendency that hardness of the surface of the pulley slightly decreases, and the wear depth of the pulley increases although slightly in magnitude will become stronger. Accordingly, the Cr content should be controlled to not more than 20 mass %, and is preferably controlled to not more than 10 mass % in order to prevent the effect of enhancement in the friction coefficient from being impaired.

Therefore, the Cr content in the surface-hardened layer as well as the steel stock is preferably kept in a range of 1 to 20 mass %, more preferably in a range of 2 to 10 mass %.

The pulley according to the invention is composed of the steel stock containing chemical elements described as above as basic constituents, together with and the balance Fe and unavoidable impurities. However, if common carburized steel scrap, and common nitriding steel scrap are used for melting raw material, there is a good possibility that a steel stock will contain the following chemical elements as the unavoidable impurity elements, so that an attempt to reduce the unavoidable impurities will result in an increase in cost. Accordingly, with the present invention, the steel stock may contain the following chemical elements as the unavoidable impurities, each of the chemical elements being up to the following content, falling within a range where the effects of the invention are not interfered with; Ti: not more than 0.050%, N: not more than 0.0250%, Al: not more than 0.10%, Ni+Cu+Mo: not more than 2.0%, B: not more than 0.0050%, V: not more than 0.10%, Nb: not more than 0.10%, Ca: not more than 0.0050%, Mg: not more than 0.0050%, Zr: not more than 0.050%, REM: not more than 0.020%, S: not more than 0.10%, P: not more than 0.10%, and O: not more than 0.0030%

(Method for Producing the Steel Stock)

The steel stock itself for use in the pulley for the continuously variable transmission, according to the invention, having the chemical composition described in the foregoing, can be produced by a conventional method, that is, the same method as is used for producing common carburized steel, and common nitriding steel. More specifically, after casting the steel stock into a steel billet having the chemical composition described as above, the steel billet is subjected to hot working such as hot rolling, hot forging, and so forth, to be followed by cold working such as cold rolling, clod forging, and so forth, as appropriate, according to the conventional method. A steel member that is worked into a rough shape by those workings is subsequently subjected to nitriding and carbonitriding, and finishing work for the pulley for the continuously variable transmission is applied thereto as appropriate.

(Surface-Hardened Layer)

A method of processing such as nitriding, carbonitriding, and so forth, currently adopted on the industrial basis, as described later, can be applied to surface-hardening of the steel stock. By applying the processing such as nitriding, carbonitriding, and so forth, the surface-hardened layer of either the nitriding layer or the carbonitriding layer, containing 1 to 10 mass % of Mn, and further, selectively containing 1 to 20 mass % of Cr, having an average thickness not less than 10 μm, is formed in the surface of the steel stock of the chemical composition described in the foregoing. The thickness of the surface-hardened layer is preferably not less than 50 μm, more preferably not less than 100 μm. There is no particular limitation to the upper limit of the thickness of the surface-hardened layer, and the upper limit can be optionally set from the viewpoint of a service life of the steel stock, and cost.

The reason why it is not carburizing but the processing such as nitriding, carbonitriding, and so forth that is superior as the surface-hardening of the steel stock, in respect of the effect of enhancement in the friction coefficient, is presumably because Mn based nitrides such as $Mn_3N$, and so forth, and Cr based nitrides such as CrN and so forth, formed in the vicinity of the steel stock surface, (the surface-hardened layer), by nitriding or carbonitriding, make a contribution to the enhancement in the friction coefficient.

(Hardness of the Surface-Hardened Layer)

In order to enhance the friction coefficient of the pulley for the belt CVT as large as not less than 0.115 as compared with the carburized steel SCr420H currently in use, and to concurrently control the wear depth of the pulley element so as to be equivalent to, or less than that for the carburized steel SCr420H currently in use, a rough guide for surface hardness of the surface-hardened layer, after the surface hardening, is preferably in a range of Hv750 to 950. If the surface hardness is less than Hv750, there is a possibility that abrasion resistance of the surface of the pulley will be insufficient. On the other hand, if the surface hardness exceeds Hv950, there is a possibility that a tendency of an increase in the wear depth of the pulley element will become stronger.

(Thickness of the Surface-Hardened Layer)

In order for the surface-hardened layer to cause the effect of enhancement in friction coefficient, due to presence of Mn and Cr, to be more stably exhibited regardless of difference in the application environments of the pulley for the belt CVT, the surface-hardened layer needs to have an average thickness (a depth from the surface) not less than 10 μm. If the average thickness of the surface-hardened layer is less than 10 μm, it is not possible to more stably exhibit the effect of enhancement in friction coefficient, due to presence of Mn and Cr, depending on the application environments of the pulley for the belt CVT. The average thickness of the surface-hardened layer is also required for ensuring the hardness of the surface-hardened layer, described as above.

(Nitrogen Content of the Surface-Hardened Layer)

In order to enhance the friction coefficient of the pulley for the belt CVT as large as not less than 0.115 as compared with the carburized steel SCr420H currently in use, and to concurrently control the wear depth of the pulley element so as to be equivalent to, or less than that for the carburized steel SCr420H currently in use, a rough guide for nitrogen content of the surface-hardened layer, after the surface hardening, is preferably in a range of 3 to 25 at. %, more preferably in a range of 8 to 20 at. %. If the nitrogen content is less than 3 at. %, nitrogen will be insufficient even though Mn content and Cr content, in the surface-hardened layer, meet the specification, so that the surface-hardened layer will be lacking in Mn based nitrides, and Cr based nitrides, and the hardness will deteriorate, thereby raising a possibility that the enhancement in the friction coefficient of the pulley surface, and the abrasion resistance thereof will be insufficient. On the other hand, if the nitrogen content exceeds 25 at. %, there is a possibility that the surface hardness will be excessively high, and a tendency of an increase in the wear depth of the pulley element will be stronger. Furthermore, there will be an increase in cost of nitriding.

Nitrogen concentration in any of those surface-hardened layers can be acquired by quantitative analysis according to EPMA (electron probe X-ray micro-analysis of micro-regions) applied from the surface of the surface-hardened layer.

(Surface Hardening)

As nitriding currently in practice on the industrial basis, a steel stock is worked on at around (500 to 600° C.)×(1 to 100 hrs) in an ammonia ($NH_3$) gas atmosphere. Further, as carbonitriding, a steel stock is subjected to nitriding at around (500 to 600° C.)×(50 to 100 hrs) in a cooling process after carburizing at around (900 to 1000° C.)×(1 to 100 hrs) in an atmosphere of a hydrocarbon gas such as methane, and CO gas.

If a nitride layer, the so-called white layer, is formed on the surface of a nitrided steel or a carbonitrided steel, the white layer is preferably removed to a small thickness by surface working such as cutting and polishing. However, care is needed in such a case because nitrogen concentration in the surface is often decreased to 20 at. % or less.

With the nitrided steel or the carbonitrided steel, attention should be paid to a nitrided depth (a thickness of the surface-hardened layer), and it is necessary to preliminarily grasp distributions of the nitrided depth, the surface hardness, and so forth, respectively, according to surface hardening conditions, to thereby confirm that those are in specified ranges, respectively, before applying surface-finishing. Thereafter, the nitrided steel or the carbonitrided steel is subjected to quenching, and tempering.

Now, the invention is more specifically described hereinafter with reference to working examples, however, it is not to be construed that the invention is limited thereto.

Working Examples

As shown in Table 1, either nitriding or carbonitriding, on the same processing conditions, was applied to the surfaces of respective steel stocks of chemical compositions variously differing in Mn content, and Cr content from each other, thereby forming various surface-hardened layers, each being either a nitriding layer or a carbonitriding layer, whereupon both friction coefficient, and abrasion resistance were measured and evaluated with respect to each of the surface-hardened layers. Results of measurement and evaluation are shown in Table 1.

With respect to each of the surface-hardened layers, an average thickness (μm), nitrogen content (average, at. %), and surface hardness (average, Hv) were concurrently measured. Those results as well are shown in Table 1.

With the respective steel stocks shown in Table 1, the total amount of Ti, N, Al, Ni, Cu, Mo, B, V, Nb, Ca, Mg, Zr, REM, S, P, and O, as other impurities, corresponded to not more than 0.15%.

Each of the steel stocks was worked into the shape of a disk 1A shown in FIG. 1, and was subsequently subjected to surface hardening on the following conditions before the surface was ground to a small thickness to be finished so as to have surface roughness Ra in a range of 0.7 to 1.3 μm. Then, a workpiece was heated to 875° C. to be subsequently subjected to water quenching, and tempering at 200° C.×1 hr was applied thereto, having thereby obtained a steel stock for testing.

(Surface Hardening)

Nitriding: The steel stock was processed at (540 to 550° C.)×72 hrs in an ammonia ($NH_3$) gas atmosphere.

Carbonitriding: In a cooling process after carburizing applied at 950° C.×50 hrs in an atmosphere of a hydrocarbon gas such as methane, and so forth, the steel stock was subjected to nitriding by causing an ammonia ($NH_3$) gas at 500° C. to flow for 3 hrs.

(Vane-On-Disk Type Sliding Test)

A vane-on-disk type sliding test using vanes 2A shown in FIG. 1, with the steel stock for testing, obtained as above, (in the shape of the disk 1A), serving as a mating material for the sliding test, was conducted in CVT oil. Then, oil friction coefficient (friction coefficient in an lubricating oil) was measured. Further, wear depths on the part of the disk 1A, and on the part of the vanes 2A, respectively, were measured.

For the vane 2A, use was made of SK5 (hardness: HRC 57 to 59, tip R 4 mm, mirror finish). As for sliding test conditions, the vane 2A under a load 100 N was slid for 300 m, and subsequently, the vane 2A was slid for 1000 m after the load was increased to 500 N. A slide velocity was kept constant at 0.7 mm/s, and for a commercially available CVT oil, use was made of a genuine oil (trade name: NS2) manufactured by Nissan Motors, kept at 100° C.

(Measurement of Friction Coefficient)

Friction coefficient μ of the disk 1A, at a point 50 m before completion of the sliding test, was worked out by an averaging process. For measurement of the friction coefficient μ, use was made of an automatic friction coefficient measuring instrument (trade name: 3-pin type oil-base slide-wear tester) manufactured by Kobe Steel Machinery Co., Ltd.

(Measurement of Wear Depth)

A mean value of wear widths at the respective tips of the vanes after completion of the sliding test was converted into a specific wear depth, having thereby worked out a vane wear depth. A disk wear depth was obtained by averaging respective worn sectional areas at four spots of a slide-move trace, as measured with a probe roughness meter after completion of the sliding test.

(Evaluation of Friction Coefficient, and Abrasion Resistance)

Friction coefficient, and abrasion resistance were evaluated in comparison with those for the SCr420H steel currently in use, similarly subjected to surface hardening, serving as criteria of assessment. More specifically, working examples equivalent to, or lower than the current SCr420H steel in respect of friction coefficient even though equivalent to, or higher than the current SCr420H steel in respect of abrasion resistance were evaluated as X. Further, working examples equivalent to, or higher than the current SCr420H steel in respect of abrasion resistance, and higher than the current SCr420H steel in respect of friction coefficient were evaluated as ○. Furthermore, working samples among those evaluated as ○, having friction coefficient increased to 0.120, were evaluated as ◎.

(Surface Hardness)

Hardness at three spots of the surface of each of the steel stocks for testing, obtained as above (the surface of the surface-hardened layer, prior to the sliding test), under a load of 10 g, was measured with the use of a micro Vickers hardness tester (trade name: "micro-hardness tester) manufactured by Matsuzawa Precision Machinery Co., Ltd., and a mean value of hardness values thus obtained was adopted as hardness HV.

(Nitrogen Content of the Surface-Hardened Layer)

Quantitative analysis of nitrogen concentration (at. %) in the surface of the surface-hardened layer was conducted according to EPMA. EPMA measurement conditions included an acceleration voltage: 10 kV, current: 2 to 5×10$^{-8}$ A, and measurement area: 100 μm square. Measurement was made at three spots, and an average of measurement values was adopted as nitrogen concentration. Measurement of Mn content and Cr content, in the surface-hardened layer, was carried out by emission spectral analysis as in the case of the Mn content and the Cr content, in the steel stock. Measurement was made at three spots, and an average of measurement values was adopted as Mn content, and Cr content, respectively.

As is evident from Table 1, working examples Nos. 1 to 22 each were of chemical composition in a range specified by the invention, containing a predetermined amount of Mn, or Mn and Cr, and the surface of the steel stock thereof had the surface-hardened layer of either the nitriding layer or the carbonitriding layer, containing the predetermined amount of Mn, or Mn and Cr, and having an average thickness not less than 10 μm. With the surface-hardened layer of each of the working examples, nitrogen content was in a range of 3 to 25 at. %. Further, with the surface-hardened layer of each of the working examples, surface hardness was in a range of Hv750 to 950.

As a result, with each of the working examples Nos. 1 to 22, the surface-hardened layer was found capable of obtaining friction coefficient not lower than 0.115, which was in excess of the friction coefficient of steel stocks currently in use (comparative examples 23, 24), and was found capable of maintaining abrasion resistance substantially equivalent to that for the comparative examples 23, 24, or improving the abrasion resistance. With the working examples Nos. 3, 17, respectively, in particular, among all the working examples, Mn content was 3 mass %, and the surface-hardened layer had friction coefficient as high as 0.120 as compared with the other working examples having Mn content less than, or more than 3 mass %. Further, with the working example No. 20 having Mn content of 3 mass %, not containing Cr, as well, the surface-hardened layer had a relatively high friction coefficient. It is evident from this point of view that the effect of enhancement in friction coefficient of the surface-hardened layer is not increased in proportion to the Mn content, but the effect indicates the maximum value with the Mn content being in the vicinity of 3 mass %.

Further, by improving friction coefficient simply by 1.001 against the friction coefficient 0.114 of the steel stocks currently in use (the comparative examples 23, 24), (simply by increasing friction coefficient to 0.115), it is possible to enhance power transmission efficiency of the pulley for the belt CVT. In this connection, with the working examples Nos. 3, 17, respectively, to enhance the friction coefficient by as much as 0.006 to 0.120 against the friction coefficient 0.114 of the steel stocks currently in use (the comparative examples 23, 24) means significant enhancement in the power transmission efficiency (power transmission performance) of the pulley for the belt CVT.

In contrast, with the steel stocks currently in use (the comparative examples 23, 24), it was not possible to enhance the friction coefficient of the surface-hardened layer even though abrasion resistance could be enhanced, so that it was not possible to reconcile one characteristic with the other characteristic. In this respect, the same can be said of comparative examples 25, 26, having excessively low Mn content, and comparative examples 27, 28, having excessively high Mn content on the contrary.

Accordingly, significance of requirements for the steel stock for use in the pulley for the belt CVT, according to the invention, can be supported on the basis of the results described as above.

TABLE 1

| classification | No. | pulley steel chemical composition (mass %) (balance Fe + impurities) | | | | surface-hardened layer of pulley steel (Mn, Cr, in mass %) | | surface-hardening | average thickness (μm) |
| --- | --- | --- | --- | --- | --- | --- | --- | --- | --- |
| | | C | Si | Mn | Cr | Mn (%) | Cr (%) | | |
| working example | 1 | 0.2 | 0.4 | 1 | 10 | 1 | 10 | nitriding | 220 |
| | 2 | 0.2 | 0.4 | 2 | 10 | 2 | 10 | nitriding | 190 |
| | 3 | 0.2 | 0.4 | 3 | 10 | 3 | 10 | nitriding | 260 |
| | 4 | 0.2 | 0.4 | 6 | 10 | 6 | 10 | nitriding | 190 |
| | 5 | 0.2 | 0.4 | 10 | 10 | 10 | 10 | nitriding | 270 |
| | 6 | 0.2 | 0.4 | 10 | 0 | 10 | 0 | nitriding | 250 |
| | 7 | 0.2 | 0.4 | 6 | 0 | 6 | 0 | nitriding | 330 |
| | 8 | 0.3 | 0.4 | 6 | 1 | 6 | 1 | nitriding | 290 |
| | 9 | 0.2 | 0.4 | 6 | 2 | 6 | 2 | nitriding | 180 |
| | 10 | 0.2 | 0.5 | 6 | 3 | 6 | 3 | nitriding | 290 |
| | 11 | 0.2 | 0.4 | 6 | 6 | 6 | 6 | nitriding | 200 |
| | 12 | 0.2 | 0.3 | 6 | 15 | 6 | 15 | nitriding | 110 |
| | 13 | 0.2 | 0.1 | 6 | 20 | 6 | 20 | nitriding | 70 |
| | 14 | 0.1 | 0.4 | 6 | 25 | 6 | 25 | nitriding | 10 |
| | 15 | 0.2 | 0.4 | 1 | 6 | 1 | 6 | nitriding | 90 |

TABLE 1-continued

| classification | No. | | | | | | | | |
|---|---|---|---|---|---|---|---|---|---|
| | 16 | 0.2 | 0.4 | 2 | 6 | 2 | 6 | nitriding | 160 |
| | 17 | 0.2 | 0.4 | 3 | 6 | 3 | 6 | nitriding | 190 |
| | 18 | 0.2 | 0.4 | 10 | 6 | 10 | 6 | nitriding | 140 |
| | 19 | 0.2 | 0.4 | 1 | — | 1 | — | carbonitriding | 30 |
| | 20 | 0.2 | 0.4 | 3 | — | 3 | — | carbonitriding | 10 |
| | 21 | 0.2 | 0.4 | 6 | — | 6 | — | carbonitriding | 20 |
| | 22 | 0.2 | 0.4 | 10 | — | 10 | — | carbonitriding | 20 |
| comparative example | 23 | SCr420H steel | | | | 0.9 | 1.2 | nitriding | 170 |
| | 24 | SCr420H steel | | | | 0.9 | 1.2 | carbonitriding | — |
| | 25 | 0.2 | 0.4 | 0.7 | 10 | 0.7 | 10 | nitriding | 160 |
| | 26 | 0.2 | 0.4 | 0.8 | 6 | 0.8 | 6 | nitriding | 180 |
| | 27 | 0.2 | 0.4 | 12 | 10 | 12 | 10 | nitriding | 160 |
| | 28 | 0.2 | 0.4 | 12 | 6 | 12 | 6 | nitriding | 140 |

| | | surface-hardened layer of pulley steel (Mn, Cr, in mass %) | | pulley steel properties | | | |
|---|---|---|---|---|---|---|---|
| classification | No. | nitrogen content (at %) | surface hardness (HV) | friction coefficient ($\mu$) | vane wear depth $\times 10^{-10}$ (mm$^3$/m/N) | disk wear depth $\times 10^{-4}$ (m$^2$) | evaluation |
| working example | 1 | 11 | 820 | 0.115 | 8.1 | 3.6 | ○ |
| | 2 | 14 | 820 | 0.117 | 7.6 | 3.6 | ○ |
| | 3 | 13 | 800 | 0.120 | 6.3 | 3.8 | ⊚ |
| | 4 | 12 | 830 | 0.118 | 5.2 | 4.0 | ○ |
| | 5 | 13 | 840 | 0.115 | 4.9 | 3.6 | ○ |
| | 6 | 19 | 920 | 0.116 | 8.6 | 3.2 | ○ |
| | 7 | 21 | 880 | 0.117 | 9.8 | 3.7 | ○ |
| | 8 | 21 | 900 | 0.118 | 9.2 | 3.2 | ○ |
| | 9 | 16 | 880 | 0.116 | 7.7 | 3.3 | ○ |
| | 10 | 25 | 880 | 0.117 | 6.2 | 3.6 | ○ |
| | 11 | 15 | 850 | 0.118 | 4.9 | 3.8 | ○ |
| | 12 | 9 | 800 | 0.115 | 4.1 | 3.6 | ○ |
| | 13 | 7 | 750 | 0.115 | 4.1 | 4.4 | ○ |
| | 14 | 3 | 690 | 0.115 | 4.0 | 4.7 | ○ |
| | 15 | 9 | 820 | 0.116 | 8.2 | 3.7 | ○ |
| | 16 | 8 | 810 | 0.118 | 7.5 | 4.2 | ○ |
| | 17 | 9 | 810 | 0.120 | 6.9 | 3.6 | ⊚ |
| | 18 | 10 | 820 | 0.115 | 5.9 | 3.8 | ○ |
| | 19 | 7 | 830 | 0.116 | 10.6 | 4.0 | ○ |
| | 20 | 5 | 860 | 0.117 | 4.9 | 3.6 | ○ |
| | 21 | 8 | 920 | 0.117 | 7.1 | 3.2 | ○ |
| | 22 | 10 | 950 | 0.115 | 10.3 | 3.0 | ○ |
| comparative example | 23 | 16 | 650 | 0.114 | 10.2 | 4.5 | X |
| | 24 | — | 670 | 0.114 | 7.6 | 4.7 | X |
| | 25 | 12 | 850 | 0.113 | 18.9 | 3.8 | X |
| | 26 | 12 | 830 | 0.114 | 13.4 | 4.1 | X |
| | 27 | 17 | 880 | 0.114 | 5.1 | 3.1 | X |
| | 28 | 16 | 840 | 0.113 | 6.2 | 3.7 | X |

While the invention has been described in detail with reference to specific embodiments thereof, it is to be pointed out that various changes and modifications will be apparent to those skilled in the art without departing from the spirit and cope of the invention. The present application is based on Japanese Patent Application No. 2006-234055 submitted on Aug. 30, 2006, and the content thereof is incorporated herein by reference.

INDUSTRIAL APPLICABILITY

As described in the foregoing, the present invention can provide a pulley capable of meeting requirements for both enhancement in friction coefficient, and maintenance of abrasion resistance, required of a belt CVT, and having enhanced friction coefficient in combination with maintenance of abrasion resistance.

The invention claimed is:
1. A pulley, comprising a steel stock that comprises:
Fe
C from 0.1 to 0.3 mass %;
Si from 0.1 to 0.5 mass %;
Mn from 2 to 6 mass %; and
Cr from 6 to 10 mass %, respectively,
wherein
the surface of the steel stock has a surface-hardened layer of a nitriding layer, comprises 2 to 6 mass % of Mn and 6 to 10 mass % of Cr, and has an average thickness not less than 10 μm;
the surface-hardened layer has a nitrogen content ranging from 3 to 25 at. %; and
the surface-hardened layer has a hardness in the range of Hv750 to 950.

2. The pulley according to claim 1, wherein at least one of the steel stock and the surface-hardened layer comprises Mn in an amount of from greater than 3 mass % to 6 mass %.

3. The pulley according to claim 1, wherein each of the steel stock and the surface-hardened layer comprises Mn in an amount of from 3 mass % to 6 mass %.

4. The pulley according to claim 1, wherein the surface-hardened layer has a friction coefficient of from 0.115 to 0.120.

5. The pulley according to claim 1, wherein each of the steel stock and the surface-hardened layer comprises Mn in an amount of from 3 mass % to 6 mass %, and the surface-hardened layer has a friction coefficient of from 0.120 to 0.115.

6. The pulley according to claim 1, wherein the unavoidable impurities comprise at least one of
Ti in an amount of not more than 0.050 mass %,
N in an amount of not more than 0.0250 mass %,
Al in an amount of not more than 0.10 mass %,
B in an amount of not more than 0.0050 mass %,
V in an amount of not more than 0.10 mass %,
Nb in an amount of not more than 0.10 mass %,
Ca in an amount of not more than 0.0050 mass %,
Mg in an amount of not more than 0.005 0 mass %,
Zr in an amount of not more than 0.050 mass %,
REM in an amount of not more than 0.020 mass %,
S in an amount of not more than 0.10 mass %,
P in an amount of not more than 0.10 mass %, and
O in an amount of not more than 0.0030 mass %, wherein the total amount of Ni, Cu, and Mo is not more than 2.0 mass %.

7. The pulley according to claim 1, wherein each of the steel stock and the surface-hardened layer comprises C in an amount of from 0.1 mass % to 0.3 mass %.

8. The pulley according to claim 1, wherein each of the steel stock and the surface-hardened layer comprises C in an amount of from 0.15 mass % to 0.25 mass %.

9. The pulley according to claim 1, wherein the average thickness of the surface-hardened layer not less than 50 μm.

10. The pulley according to claim 1, wherein the average thickness of the surface-hardened layer not less than 100 μm.

11. The pulley according to claim 1, wherein the surface-hardened layer has a nitrogen content ranging from 8 at. % to 20 at. %.

12. The pulley according to claim 1, wherein the surface-hardened layer has a hardness in the range of Hv800 to 900.

13. The pulley according to claim 1, wherein each of the steel stock and the surface-hardened layer comprises Mn in an amount of about 3 mass %.

14. A pulley, comprising a steel stock that comprises:
Fe
C from 0.1 to 0.3 mass %;
Si from 0.1 to 0.5 mass %;
Mn from 2 to 6 mass %; and
Cr from 6 to 10 mass %, respectively,
wherein
the surface of the steel stock has a surface-hardened layer of a nitriding layer, comprises 2 to 6 mass % of Mn, 6 to 10 mass % of Cr, and 3 to 25 at. % of nitrogen, and has an average thickness not less than 10 μm,
the surface-hardened layer has a hardness in the range of Hv750 to 950, and
the surface-hardened layer has a friction coefficient not lower than 0.115.

15. The pulley according to claim 14, wherein the surface-hardened layer has a friction coefficient of from 0.115 to 0.120.

16. The pulley according to claim 14, wherein the surface-hardened layer has a hardness in the range of Hv800 to 900.

* * * * *